Patented Apr. 15, 1952

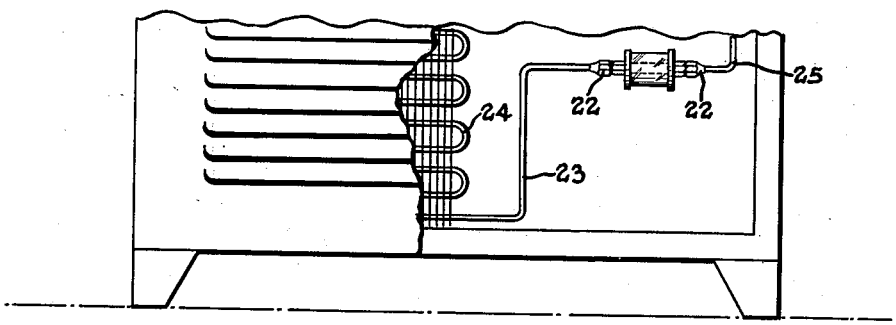
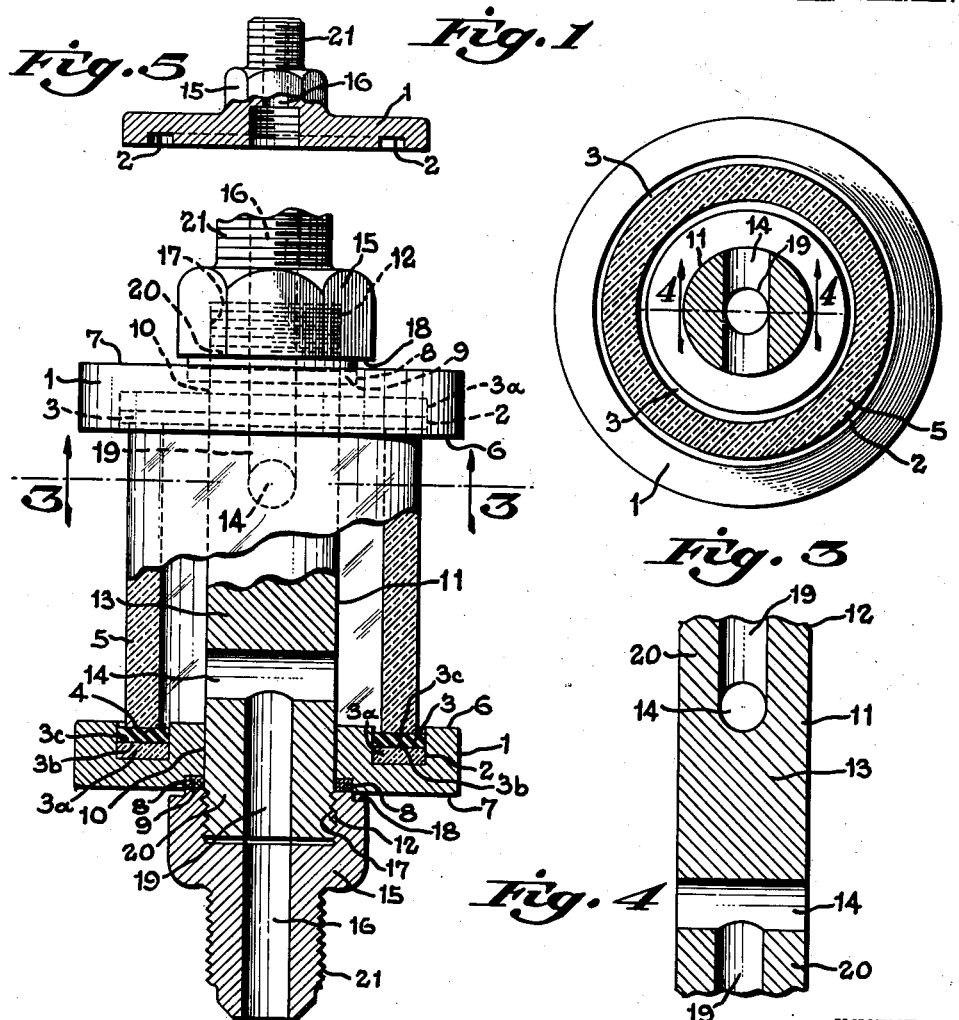
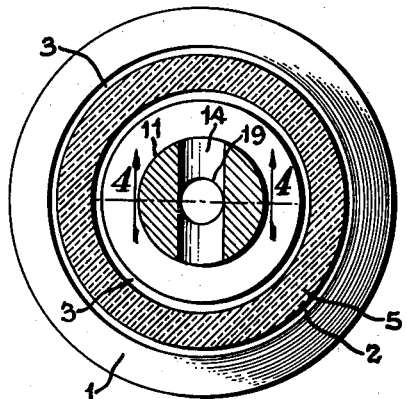
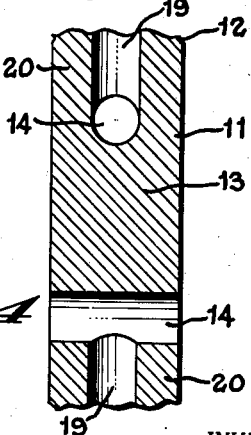

2,592,848

UNITED STATES PATENT OFFICE 2,592,848

SIGHT GLASS FITTING FOR PIPING SYSTEMS

Philip Baird, Cincinnati, Ohio, assignor to Cee-Kleer Products, Inc., Cincinnati, Ohio, a corporation of Ohio Application September 30, 1948, Serial No. 51,997

9 Claims. (Cl. 138—37)

This invention relates to fittings having transparent mediums, such as sight glasses, for use in closed piping systems, to expose the liquids and/or gases flowing through the system and specifically relates to sight glasses with means to turbulate and change the direction in the flow of the liquids within the sight glasses.

It is an object of my invention to provide a fitting with transparent means to expose the flow of fluids in liquid and/or gaseous state to view it within a closed piping system, that will insure the inspection of all the liquids and gases, and that will prevent any of the liquids or gases from by-passing inspection while flowing through the fitting.

Another object of my invention is to provide an inspection fitting of relative simple construction whereby the functional elements serve the dual purpose of structure and function.

Another object is to provide a combination of gaskets made of non similar materials, for sealing the joints between the transparent medium and other components, that will not wrinkle or corrugate when my fitting is assembled.

These and other objects will be more specifically pointed out in the specifications and drawings forming part of my application.

In the drawings:

Figure 1 is a view of part of a refrigeration condenser for a refrigeration piping system shown in elevation.

Figure 2 is a view showing my sight fitting shown in elevation with part in section.

Figure 3 is a view in section showing my sight fitting in plan and taken on line 3—3 of Figure 2.

Figure 4 is a view of my flow deflector shown in elevation and in section taken on line 4—4 of Figure 3.

Figure 5 is a view of an alternate structure for the caps shown in elevation with part in section.

Modern piping of the so called closed or hermetically sealed systems, utilize joints and connections that can be sweated, welded and/or soldered in lieu of the threaded connections. This type of connection reduces leaks to and from within the system and it is desirable to avoid disconnecting any or as few of the joints when alterations or repairs are made. Since all of the systems are constructed of opaque pipe, fittings and mechanical operating parts some means is necessary to discover wherein the system is failing to function properly.

In the case of refrigeration system failures are primarily due to deterioration of the refrigerant gases and/or liquids because of entrained foreign matter such as oil, water and/or air. If these deterrents can be discovered by inspection with the aid of my sight glass the piping system and the mechanical elements contained can be left undisturbed in its original state while seeking the cause for failure. This obviously is less costly and insures against unnecessary disturbing properly functioning parts which cannot be avoided when using trial and error process of eliminating troubles within the systems.

A gasket is required to seal the joint between the sight glass and the other components of my fitting. The gasket must be made of compressible material that will not wrinkle and allow leakage. Various combinations of metal and rubber or fibre washers were tried but these combinations produced wrinkles and permitted leakage.

I have discovered that washers composed of two one being of neoprene or the like that is compressible in combination with another neoprene or asbestos type washer that is less compressible is the ideal combination and does prevent wrinkling during assembly. The reason for this is that the second washer which is less compressible compensates for the creeping that is necessary between the first compressible washer and the metal components securing my sight glass to my fitting.

To this end I have invented a sight glass wherein the liquids and/or gases flowing within a closed system can be inspected while in motion and thereby detect whether the mechanical working parts or the refrigerant is at fault.

While I use refrigerating systems as an example I do not intend my invention to be limited to that alone. Anyone skilled in the art of piping systems will recognize the multitudinous uses to which my invention can be applied.

Referring to Figure 2, I have shown my inspection sight fitting completely assembled. It has main body caps 1 with annular grooves 2 in one face 6 for retaining gaskets 3 that act as a cushion for ends 4 of a transparent hollow cylinder 5. The gaskets 3 are made of soft rubber or neoprene that can be compressed and allow the ends of the transparent hollow cylinder to be imbedded. Another washer 3a also of rubber or asbestos is in contact with washer 3. This last mentioned washer is made of material that is less compressible than the first washer and surfaces 3b of these washers are harder and smoother to minimize the friction between the surfaces 3b and 3c of the washer 3. This differential between the washers allows slippage in relation to each other and prevents wrinkling during assembly. The gaskets also insure against leakage to and from within the hollow cylinder when its ends are embedded in the gasket 3.

In other faces 7 there are other annular grooves 8 for gaskets or lock washers 9. Holes 10 through the caps are provided for to retain them on a stud.

The stud 11 has two male threaded ends 12 for connecting the caps and holding them in place on the hollow cylinder to form an inner inspection chamber around the stud. The stud has a solid central portion 13 between two spaced passages 14 that extend through the stud at right angles to its longitudinal axis and are at right angles to each other. Other passages 19 in the ends 20 of the stud are parallel to the axis of the stud and end in the first mentioned passages thereby forming a hollow T passage within each end of the stud. Liquids flow in and out of the cylinder through these passages.

Exterior couplings 15 have passages 16 for extending the hollow T passages to the exterior of the fitting. These are female threaded holes 17 for screwing the couplings to the studs. Annular shoulders 18 on the couplings apply pressure to the caps when the couplings are screwed on the stud and in turn apply pressure between the caps, gaskets and cylinder respectively to hold them together and thereby form my inspection sight fitting. Male threaded ends 21 are provided for connecting my inspection sight fitting into a piping system as shown at 22 in Figure 1. While I show these ends threaded they can also be made for the threadless sweat type connection.

In Figure 5 I have illustrated an alternate type of cap in which the coupling and cap are integral. This type of cap can be used when a gasket can be dispensed with. Certain cases it will be possible to make a seal between the cap and cylinder by using compounds such as glycerine and litharge or the like. With this type of cap two extra joints are eliminated.

When my fitting is installed as shown in Figure 1 it is connected to inlet piping 23 coming from a condenser, receiver or any other piece of apparatus 24 and outlet pipe 25. Fluids and gases flowing into the fitting will enter at one end through the hollow T passage and be directed to flow at right angles to its original line of flow in the piping system. This change in direction will disperse the fluids towards the inner walls of the hollow transparent cylinder where the fluid and any entrained matter can be observed and detected. Since the fluid is being circulated it will have to leave through the other hollow T passage and in leaving will again change direction. There will be four changes in the line of flow between entering and leaving the fitting and each change will be at right angles to the previous change while passing through the cylinder to reach the pipe 25.

It should be noted that the fluids will be turbulated and this turbulation will allow any entrained solids to separate and drop out of the fluids while passing through the inspection sight fitting. If there is any entrained air it, up to a certain content, will be separated and remain within the cylinder.

The reason for using a circular inspection cylinder is that the column of liquid can be inspected readily from all sides and not only on a surface as in the case with the plane window type inspection openings.

Having thus described my invention I claim:

1. A sight glass fitting for piping systems containing circulating fluids, comprising; a hollow cylinder with transparent walls, end closure means with centrally located openings therein positioned and secured to ends of said hollow cylinder to form a transparent chamber and centrally located means with axial and lateral spaced passages in the ends thereof to interrupt and change the direction of the flow of said circulating fluids into and out of said hollow cylinder, secured in the openings of said end closure means to secure said hollow cylinder to said end closure means and other means for securing said sight glass fitting in said piping system and securing said end closure means to said hollow cylinder and centrally located means to form an inspection medium for fluids flowing through said piping system.

2. A sight glass fitting for piping systems containing circulating fluids comprising; a hollow cylinder with transparent walls, end closure means secured to and positioned at ends of said hollow cylinder to form a chamber to receive said fluids, centrally located means having means to secure said end caps to the ends of said cylinder having spaced T-shaped passages for changing the direction of the flow of fluids to and from said chamber and other means to be secured to said centrally located means to form and secure said sight glass fitting within said piping system.

3. A sight glass fitting for piping systems containing circulating fluids, comprising; a hollow cylinder with transparent walls, end closure means with centrally located apertures adapted to be secured to ends of said hollow cylinder to form a transparent chamber for said circulating fluids, and centrally located means positioned within said apertures in said end closure means having spaced passages at the ends thereof providing an inlet and an outlet for fluids flowing through said transparent chamber and other means secured to said centrally located means to secure said end closure means to said hollow cylinder and within said piping system to provide an inspection medium for the fluids flowing through said piping system.

4. A sight glass fitting for piping systems for circulating fluids, comprising; a hollow cylinder with transparent walls, end closure means secured to ends of said hollow cylinder to form a transparent chamber for said fluids, centrally located means within said cylinder and end closure means having spaced passages at the ends thereof providing inlets and outlets for the flow of fluids through said chamber and coupling means secured to ends of said centrally located means to hold said end closure means, hollow cylinder and centrally located means in fixed relationship and providing means for securing said sight glass fitting in said piping system.

5. A sight glass fitting for piping systems for circulating fluids, comprising; a hollow cylinder with transparent walls, end closure means with centrally located openings secured to ends of said hollow cylinder to form a transparent chamber for said circulating fluids, a conduit positioned within said hollow cylinder and said enclosure means having a partition at right angles to an axial channel of said conduit approximately in the longitudinal center thereof to interrupt the continuous flow of fluids therethrough, openings in walls of said conduit on each side of said partition connecting to said axial channel to permit the flow of said fluids into and out of said hollow cylinder and means adapted to be secured to the ends of said conduit when it is positioned in the openings in said end closure means to secure the said conduit, hollow cylinder and end closure means in fixed relation to each other to form said sight glass fitting.

6. A sight glass fitting for piping systems for circulating fluids comprising; a hollow cylinder with transparent walls, end closure means with centrally located openings therein and means thereon for positioning the said hollow cylinder in fixed relation thereto to form a transparent chamber for said fluids, centrally located means within said hollow cylinder and end closure means having axial passages in the ends thereof intersecting other passages at right angles to said axial passages to direct the flow of said fluids into and from said transparent chamber and other means secured to ends of said centrally located means and thereby secure the end closure and hollow cylinder means in fixed relation to each other to form said sight glass fitting.

7. An inspection sight glass fitting for piping systems for circulating fluids comprising; a glass cylinder, end caps with centrally located holes and annular grooves adapted to receive and position ends of said glass cylinder therein to form a chamber for said fluids, a central stud with threaded ends having axial holes in each end thereof together with other holes at right angles to said axial holes to direct the flow of fluids into and out of a chamber formed by said glass cylinder, said stud adapted to be positioned within said glass cylinder in the holes in the end caps, and male and female threaded couplings screwed on the said threaded ends of the said stud to secure the said stud, end caps and glass cylinder in fixed position relative each to the other to form said sight glass fitting.

8. An inspection sight glass fitting for piping systems for circulating fluids, comprising; a glass cylinder, end caps with centrally located openings together with annular grooves adapted to receive and position ends of said glass cylinder therein to form a chamber for said fluids, multiple washers positioned in said annular grooves adjacent said ends of glass cylinder adapted for relative motion each to the other to seal joints between said ends of said glass cylinder and end caps, a central stud positioned within said glass cylinder and end caps with threaded ends having axial channels connecting to other channels at right angles to said axial channels in each end thereof to direct the flow of fluids into and out of a chamber formed by said glass cylinder and end caps, and male and female threaded couplings screwed on said threaded ends of said stud to secure the said stud, end caps and glass cylinder in fixed position relative each to the other to provide said inspection sight glass fitting.

9. A sight glass fitting for piping systems containing circulating fluids, comprising a hollow cylinder with transparent walls, multiple end closure means having orifices therethrough secured and positioned at the ends of said hollow cylinder to form a transparent chamber, solid centrally located means extending through said cylinder and said orifices in said end closure means to position and secure said end closure means in relation to the said ends and transparent walls of said hollow cylinder said solid centrally located means having an interrupted internal channel for the flow of said fluid in said piping system and other channelled means secured to said solid centrally located means to secure said end closure means to ends of said hollow cylinder to form said sight glass fitting and to secure said sight glass fitting in said piping system.

PHILIP BAIRD.

REFERENCES CITED

The following references are of record in the file of this patent:

UNITED STATES PATENTS

| Number | Name | Date |
|---|---|---|
| 233,609 | Ford | Oct. 26, 1880 |
| 416,722 | Ditto | Dec. 10, 1889 |
| 1,042,730 | Walquist | Oct. 29, 1912 |
| 1,809,350 | Nichols | June 9, 1931 |
| 2,294,118 | Leary | Aug. 25, 1942 |
| 2,359,239 | Newton | Sept. 26, 1944 |